United States Patent
Albenge et al.

(10) Patent No.: US 12,486,413 B2
(45) Date of Patent: Dec. 2, 2025

(54) PROCESS OF PREPARATION OF AN AQUEOUS GEL INK WITH FIXED COLOR COMPRISING SILVER NANOPARTICLES

(71) Applicants: SOCIETE BIC, Clichy (FR); UNIVERSITE DE HAUTE ALSACE, Mulhouse (FR); CENTRE NATIONAL DE LA RECHERCHE SCIENTIFIQUE, Paris (FR)

(72) Inventors: Olivier Albenge, Clichy (FR); Romain Metillon, Clichy (FR); Karine Mougin, Paris (FR); Feriel Ghellal, Clichy (FR); Arnaud Spangenberg, Mulhouse (FR)

(73) Assignees: SOCIÉTÉ BIC, Clichy (FR); UNIVERSITÉ DE HAUTE-ALSACE, Mulhouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 886 days.

(21) Appl. No.: 17/632,155

(22) PCT Filed: Aug. 28, 2020

(86) PCT No.: PCT/EP2020/074156
§ 371 (c)(1),
(2) Date: Feb. 1, 2022

(87) PCT Pub. No.: WO2021/038087
PCT Pub. Date: Mar. 4, 2021

(65) Prior Publication Data
US 2022/0275230 A1 Sep. 1, 2022

(30) Foreign Application Priority Data
Aug. 29, 2019 (EP) .................................... 19306050

(51) Int. Cl.
*C09D 11/00* (2014.01)
*C09D 11/17* (2014.01)

(52) U.S. Cl.
CPC .................................. *C09D 11/17* (2013.01)

(58) Field of Classification Search
CPC ...................................................... C09D 11/17
USPC ........................................... 106/31.01, 31.13
See application file for complete search history.

(56) References Cited

U.S. PATENT DOCUMENTS

| 9,556,350 B2 | 1/2017 | De La Vega et al. |
| 2011/0039078 A1 | 2/2011 | Fournet et al. |
| 2012/0283336 A1 | 11/2012 | Grigorenko et al. |

FOREIGN PATENT DOCUMENTS

| CN | 103200825 A | 7/2013 | |
| CN | 106867315 A | 6/2017 | |
| CN | 107022241 A | * 8/2017 | ............ C09D 11/16 |
| CN | 108530994 A | 9/2018 | |
| EP | 0837113 B1 | 12/2004 | |
| JP | 2008505252 A | 2/2008 | |
| JP | 2008106315 A | 5/2008 | |
| JP | 2008297323 A | 12/2008 | |
| JP | 2012521491 A | 9/2012 | |
| JP | 2019502022 A | 1/2019 | |
| KR | 20100003437 A | 1/2010 | |
| WO | 2006132643 A2 | 12/2006 | |
| WO | 2009056401 A1 | 5/2009 | |

OTHER PUBLICATIONS

Shikang W., "Principle and Progress for the Surface Plasmon Resonance Sensor", Technical Institute of Physics and Chemistry, Chinese Academy of Sciences, Beijing 100190, P. R. China, Imaging Science and Photochemistry, doi: 10.7517/j. issn: 1674-0475. 2017.01.015, Article No. 1674-0475(2017)01-0015-11 (23 pages).
International Search Report and Written Opinion in International Application No. PCT/EP2020/074156, mailed Nov. 20, 2020 (11 pages).

* cited by examiner

*Primary Examiner* — James E Mcdonough
(74) *Attorney, Agent, or Firm* — Bookoff McAndrews, PLLC

(57) ABSTRACT

The present invention concerns a process for preparing an aqueous gel ink with fixed color comprising the following steps: (i) preparing a gel-based matrix of aqueous ink; (ii) preparing an aqueous suspension of silver nanoparticles with fixed color by mixing silver salts with: —water, —a mixture of at least an alkali metal or alkaline earth metal salt of citrate, preferably an alkali citrate salt and an alkali metal hydride, preferably NaBH4, —a further reducing agent, preferably ascorbic acid, —and oxidizing agent, preferably hydrogen peroxide $H_2O_2$ (iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

12 Claims, No Drawings

PROCESS OF PREPARATION OF AN AQUEOUS GEL INK WITH FIXED COLOR COMPRISING SILVER NANOPARTICLES

CROSS-REFERENCE TO RELATED APPLICATIONS

This application is the U.S. national phase entry under 35 U.S.C. § 371 of International Application No. PCT/EP2020/074156, filed Aug. 28, 2020, which claims priority to European Patent Application No. 19306050.6, filed Aug. 29, 2019, the entire contents of which are incorporated herein by reference.

The present invention concerns a process for preparing an aqueous gel ink with fixed color, and to aqueous gel inks with fixed color comprising silver nanoparticles obtainable according to the process of the invention. The invention also concerns a writing instrument comprising an aqueous gel ink with fixed color according to the invention.

One of the main objectives of the present invention is to replace all type of dyes and pigments normally present in aqueous gel inks, which have the disadvantage of being expensive and causing high production costs.

Another objective of the present invention is to replace all types of dyes and pigments normally present in aqueous gel inks, which have the disadvantage of being irritating to biological membranes, for example skin and eyes, and may cause allergies.

The inventors have surprisingly found that the new aqueous inks containing nanoparticles-based are also resistant to UV light thereby improving light stability over time.

Moreover silver nanoparticles have antibacterial properties and therefore the amount of other antibacterial agents can be lowered.

To this end, the inventors have developed a specific process through which it is possible to obtain new aqueous inks with fixed color when writing by replacing former aqueous inks containing dyes and pigments by new ones that are nanoparticles-based. The process developed within the framework of the invention also presents the advantage of being performed in aqueous media, and therefore to be a "green process". In addition, the process of the invention is performed at low temperature ranges, works in an ecologically viable manner, and also takes account of ecological requirements.

The present invention thus relates to process for preparing an aqueous gel ink with fixed color comprising the following steps:
(i) preparing a gel-based matrix of aqueous ink;
(ii) preparing an aqueous suspension of silver nanoparticles with fixed color by mixing silver salts with:
water,
a mixture of at least an alkali metal or alkaline earth metal salt of citrate, preferably an alkali citrate salt and an alkali metal hydride, preferably $NaBH_4$,
a further reducing agent, preferably ascorbic acid,
and oxidizing agent, preferably hydrogen peroxide $H_2O_2$
(iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

According to a preferred embodiment of the invention, the process for preparing an aqueous gel ink with fixed color comprising the following steps:
(i) preparing a gel-based matrix of aqueous ink;
(ii) preparing an aqueous suspension of silver nanoparticles with fixed color by mixing silver salts with:
water,
a mixture of at least an alkali citrate salt and $NaBH_4$,
ascorbic acid,
and hydrogen peroxide $H_2O_2$,
(iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

The present invention also relates to a process for preparing an aqueous ink wherein preparing a matrix of aqueous ink in step (i). The present invention also relates to an aqueous ink that is obtainable through such process. The various embodiments described hereafter regarding the process of preparation of an aqueous gel ink and regarding the aqueous gel ink that can be obtained through this process can be as well considered for the process of preparation of the aqueous ink and for the aqueous ink thus obtained, in particular regarding the nature and/or content of the components. These embodiments regarding the aqueous ink, its process of preparation are also part of the present invention.

In the sense of the invention, the term "fixed color" is intended to mean that the color of the aqueous gel ink by visual observation is the same before application on absorbing support, and after application on absorbing support, specifically paper, cardboard or textiles, within 7 calendar days (one week).

For the purposes of the present invention, the term "ink" is intended to mean a "writing ink" which is intended to be used in a writing instrument, and in particular in a pen. A writing ink should not be confused with a "printing ink" which is used in printing machines and which does not have the same technical constraints and thus the same specifications. Indeed, a writing ink must not contain solid particles of which the size is greater than the channels of the writing instrument, in order to avoid blocking them, which would inevitably lead to writing being irreversibly stopped. In addition, it must allow an ink flow rate suitable for the writing instrument used, in particular a flow rate of between 100 and 500 mg/200 m of writing, and specifically between 150 and 400 mg/200 m of writing. It must also dry sufficiently rapidly to avoid smudging the writing medium. It must also avoid the problems of migration (bleeding) over time. Thus, the ink according to the present invention will be suitable for the writing instrument for which it is intended, in particular for a pen.

In addition, a "writing ink" must not be too fluid, so as to avoid leaks during writing. However, it must be sufficiently fluid to facilitate the flow of the writing action.

In the particular case of the invention, the writing ink can be more specifically a "gel ink" (which corresponds therefore to a thixotropic ink), in particular viscosity measured at rest (at a shear rate of $0.01\ s^{-1}$) at 20° C. is different and in particular higher than the viscosity measured with a shear rate of $100\ s^{-1}$ at 20° C. using the same rheometer such as a cone-and-plate rheometer for example Malvern KINEXUS with a cone of 60 mm and an angle of 1°. In a particular embodiment, the viscosity of the gel ink measured under these conditions ranges from 1,000 to 7,000 mPa·s, specifically from 2,000 to 5,000 mPa·s and more specifically from 2,500 to 3,500 mPa·s, with a shear rate of $1\ s^{-1}$, and specifically from 5 to 50 mPa·s, more specifically from 7 to 40 mPa·s and still more specifically from 10 to 20 mPa·s with a shear rate of $5,000\ s^{-1}$. Specifically, such a viscosity is stable during storage for at least three months at 40° C.

and 20% relative humidity, in particular the viscosity will not have a more than 50% decrease. More specifically, the return to viscosity at rest after shear is very quick, specifically at most a few minutes, in order to avoid the static leakage in the minutes after writing.

The process according to the invention enables to obtain an aqueous ink composition, more specifically the composition obtained by this process exhibits a plasmon effect (also called plasmonic effect). Hence, different plasmonic color of the composition can be obtained depending on the content of the components used.

In fact, the plasmonic color is due to both the light absorption by silver nanoparticles and/or the spacing between them in the material.

Depending on their size, shape and distance, the color of the solution (or material they are in) may change, as well as its properties. This is due to the plasmon resonance, often present in the case of metallic nanoparticles (silver).

The exposure of the silver particles to a certain frequency of waves brings the electrons to gather in a certain place, which changes in accordance with the shape and size of the silver particles. This agglomeration of electrons may produce an anisotropy of the particle, which will then lead to a change of light absorption and scattering, resulting in a specific color.

Plasmon resonance may also affected by the distance between the particles due to the coupling of said silver particles. Indeed, closer the silver particles are, the more they will interact with each other, which will increase their coupling effect also called Plasmon effect.

In the same way, the shape influences the plasmon resonance.

In particular, such plasmonic effect can be characterized by UV (ultraviolet)-visible-NIR (near infra-red) absorption spectroscopy.

In the present invention, the gel-based matrix of aqueous ink prepared in step (i) may comprise from 50 to 95%, specifically from 60 to 90%, and more specifically from 70 to 85%, by weight of water.

The gel-based matrix of aqueous ink prepared in step (i) may also comprise classic gel ink ingredients such as co-solvents, antimicrobial agents, corrosion inhibitors, antifoam agents, rheology modifiers, etc. The gel ink ingredients used to prepare the gel-based matrix of aqueous ink of step (i) will be largely described below, in relation with the subject-matter of the aqueous gel ink with fixed color of the invention.

The gel-based matrix of aqueous ink is prepared by methods well known by the one skilled in the art such as by simple mixing of its ingredients.

In a specific embodiment, the gel-based matrix of aqueous ink does not contain any coloring agent. Therefore it does not contain any dyes or pigments. In this case, the gel-based matrix of aqueous ink is transparent.

In another specific embodiment, the gel-based matrix of aqueous ink does not contain any reducing agent or any oxidizing agent.

In another specific embodiment, the gel-based matrix of aqueous ink does not contain any polyvinylpyrrolidone.

In the present invention, the silver salts are specifically silver(I) salts such as $AgNO_3$, $AgClO_4$, $Ag_2SO_4$, $AgCl$, $AgBr$, $AgOH$, $Ag_2O$, $AgBF_4$, $AgIO_3$, $AgPF_6$ and mixture thereof, more specifically it is nitrate silver $AgNO_3$. In particular the silver salts are in the form of a solution of silver nitrate in water.

In a specific embodiment, the total amount of silver salts added in step (ii) ranges from 0.0001 to 0.005 weight %, specifically from 0.0006 to 0.005 weight %, based on the total weight of the aqueous suspension.

Silver nanoparticles are formed when contacting the silver salts with the reducing agent and the oxidizing agent.

In the present invention, a mixture of at least an alkali metal or alkaline earth metal salt of citrate, preferably an alkali citrate salt and an alkali metal hydride, preferably $NaBH_4$, are responsible for the color in step (ii).

In the present invention, the alkali metals of citrate are chosen among lithium citrate, sodium citrate, potassium citrate, rubidium citrate, caesium citrate and francium citrate, preferably sodium citrate or potassium citrate, more preferably sodium citrate.

In a specific embodiment of this invention, the alkali metal salt of citrate is sodium citrate.

In the present invention, the alkaline earth metal salts of citrate are chosen among beryllium citrate, magnesium citrate, calcium citrate, strontium citrate, barium citrate and radium citrate, preferably magnesium citrate or calcium citrate, more preferably calcium citrate.

In a specific embodiment of this invention, the alkaline earth metal is calcium citrate.

In the present invention, the alkali metal hydride are chosen among sodium borohydride ($NaBH_4$), sodium cyanoborohydride ($NaBH_3CN$), sodium triacetoxy borohydride ($NaHB(OAc)_3$), sodium tri-sec-butylborohydride, potassium tri-sec-butylborohydride, potassium triethylborohydride, lithium triethylborohydride, lithium tri-sec-butylborohydride, nickel borohydride, lithium aluminate hydride, diisobutylaluminium hydride, sodium bis (2-methoxyethoxyaluminium hydride.

In a specific embodiment of this invention, the alkali metal hydride is sodium borohydride ($NaBH_4$).

According to a preferred embodiment of this invention, a mixture of sodium citrate and sodium borohydride ($NaBH_4$) are responsible for the coloring step (ii).

In a specific embodiment, the amount of said citrate salts added in step (ii) ranges from 0.02 to 0.1 weight %, specifically from 0.05 to 0.1 weight %, based on the total weight of the aqueous suspension.

In a specific embodiment, the amount of alkali metal hydride added in step (ii) ranges from 0.0005 to 0.002 weight %, specifically from 0.0008 to 0.002 weight %, based on the total weight of the aqueous suspension.

In the present invention, the step (ii) comprises:
a first step ii.a) of mixing said alkali metal or alkaline earth metal salt of citrate salts, preferably chosen from alkaline earth citrate salts, preferably chosen from alkaline earth citrate salts, more preferably sodium citrate with said alkali metal hydride, preferably chosen from $NaBH_4$, and with said oxidizing agent
followed by a second step ii.b) comprising the addition of said further reducing agent, and
followed by a third step ii.c) comprising a further addition of silver salt.

The mechanism of formation of colloidal solution from the reduction of silver ions consists of two steps: nucleation and growth. The nucleation step required high activation energy while the growing step requires low activation energy.

According to a preferred embodiment of the invention, the process for preparing an aqueous suspension of silver nanoparticles with fixed color (ii) comprises the following steps:
mixing initially silver salts with water and a mixture of at least an alkali metal or alkaline earth metal salt of citrate, preferably an alkaline citrate salt and an alkali metal hydride, NaBH$_4$ and oxidizing agent, preferably hydrogen peroxide H$_2$O$_2$, (step: nucleation)

mixing the previous composition with silver salts and a further reducing agent, specifically ascorbic acid (step: growth).

In a specific embodiment, the molar ratio between the silver salts and the mixture of at least an alkali metal or alkaline earth metal salt of citrate, preferably an alkaline citrate salt and an alkali metal hydride ranges from 0.005:1 to 0.20:1 and specifically from 0.01:1 to 0.15:1.

In the present invention, the further reducing agent added in step (ii) is preferably chosen in the group consisting of hydroxylamine (NH$_2$OH), ascorbic acid, oxalic acid, formic acid, formaldehyde, hydrazine, substituted hydrazine e.g. 1,1-dimethylhydrazine or 1,2-dimethylhydrazine, sodium hydrosulfite, tributylstannane, tributyltin hydride, triphenylphosphine, triphenylphosphite, triclhlorosilane, triethylsilane, tris(trimethylsilyl)silane or polymethylhydroxylisane, and mixture thereof, preferably it is ascorbic acid.

In a specific embodiment, the further reducing agent added in step (ii) is ascorbic acid.

The reducing agent reduces the silver salts to elemental silver (i.e. oxidation state: 0).

In a specific embodiment, the amount of the further reducing agent added in step (ii) ranges from 0.002 to 0.01 weight %, specifically from 0.004 to 0.008 weight %, based on the total weight of the aqueous suspension.

In a specific embodiment, the molar ratio between the silver salts and the further reducing agent ranges from 5 to 100% and specifically from 8 to 80%.

In the present invention, the oxidizing agent is chosen among C$_1$-C$_8$ alkyl peroxyacids, e.g. peracetic acid, acetyl cyclohexane sulfonyl peroxide, diisopropyl peroxydicarbonate, tert-amyl perneodecanoate, tert-butyl perneodecanoate, tert-butyl perpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinic acid peroxide, diacetyl peroxide, dibenzoyl peroxide, tert-butyl per-2-ethylhexanoate, bis(4-chlorobenzoyl)-peroxide, tert-butyl perisobutyrate, tert-butyl permaleinate, 1,1-bis(tert-butyl peroxy)3,5,5-tri methylcyclohexane,1,1-bis(tert-butylperoxy) cyclohexane, tert-butyl peroxy isopropylcarbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2 bis(tert-butylperoxy) propane, dicumyl peroxide, 2,5-dimethylhexane-2,5-di-tert-butyl peroxide, 3-tert-butylperoxy 3-phenyl phthalide, di-tert-amyl peroxide, α,α'-bis(tert-butyl peroxyisopropyl)benzene, 3,5-bis(t-butylperoxy)3,5-dimethyl 1,2-dioxolane, di-tert-butylperoxide, 2,5-dimethylhexyne-2,5-di-tert-butylperoxide and 3,3,6,6,9,9-hexamethyl-1,2,4,5-tetraoxacyclononane, hydrogen peroxide H$_2$O$_2$ and mixtures thereof.

Hydrogen peroxide (H$_2$O$_2$) may be considered a "green" reagent, in that the decomposition thereof ultimately leads to the formation of water and oxygen.

According to a preferred embodiment of this invention, the oxidizing agent is hydrogen peroxide H$_2$O$_2$.

In a specific embodiment, the amount of oxidizing agent added in step (ii) ranges from 0.001 to 0.005 weight %, specifically from 0.002 to 0.005 weight %, based on the total weight of the aqueous suspension.

In a specific embodiment, the aqueous suspension of step (ii) does not contain any stabilizer. In particular it does not contain polyvinylpyrrolidone.

The aqueous suspension of silver nanoparticles obtained in step (ii) has a fixed color. Its color will depend on the amount of silver salts. For example, the color can change from yellow to orange to red with higher amount of silver salts.

The silver nanoparticles of the aqueous suspension obtained in step (ii) can have the shape of spheres or a polyhedral shape, specifically a polyhedral shape.

In one aspect, the present invention also relates to a process for preparing an aqueous suspension of silver nanoparticles with fixed color according to step (ii) and to the aqueous suspension obtainable according to step (ii).

In the last step of the process (step (iii)), the addition of the aqueous suspension of silver nanoparticles in the gel-based matrix of aqueous ink, the color of the ink obtained will be different from the color of the aqueous suspension obtained in step (ii). For example if the aqueous suspension has a yellow color, the color of the ink will appear pink, if the aqueous suspension has an orange color, the color of the ink will appear blue and if the aqueous suspension has a red color, the color of the ink will appear black.

The process of the invention can be performed over a wide range of temperature. In general, the process is performed within the temperature range of 0 to 100° C., specifically 5 to 70° C., and more specifically 10 to 40° C. The relatively low process temperatures contribute to process efficiency and process economy, and additionally meet the current ecological demands. Indeed, the process of the invention is performed in aqueous media, and is therefore a "green process". In addition, lower temperatures have the advantage that more stable dispersions are obtained and the silver nanoparticles exhibit better redispersibility. The present invention also concerns an aqueous gel ink with fixed color obtainable by the process of the invention, said aqueous gel comprising silver nanoparticles dispersed therein.

In a specific embodiment the silver nanoparticles are the only coloring agent of the aqueous gel ink of the invention. In this case, the aqueous gel ink according to the invention does not contain any other coloring agent than the silver nanoparticles.

In the aqueous gel ink with fixed color of the invention, the silver nanoparticles can have the shape of spheres or a polyhedral shape, specifically a polyhedral shape.

In the aqueous ink with fixed color of the invention, more specifically the aqueous gel ink with fixed color, the silver nanoparticles of the invention have specifically an average particle size ranging from 1 to 200 nm and more specifically from 2 to 100 nm.

In particular, in the aqueous ink with fixed color of the invention, more specifically the aqueous gel ink with fixed color, the silver nanoparticles of the invention have specifically an average particle size ranging from 10 to 100 nm and more specifically from 20 to 50 nm. This average particle size is determined by analysis of 2D images (microscope: JEOL ARM 200), according to the standard 1509001:2015.

In particular, in the aqueous ink with fixed color of the invention, more specifically the aqueous gel ink with fixed color, the amount of silver nanoparticles specifically ranges from 0.0001 to 5 weight % and more specifically from 0.0001 to 3 weight %, even more specifically from 0.0002 to 3 weight %, relative to the total weight of the aqueous ink.

In particular, in the aqueous ink with fixed color of the invention, more specifically the aqueous gel ink with fixed color, the amount of silver nanoparticles specifically ranges from 0.0001 to 0.005% and more specifically from 0.0003 to 0.003%, by weight relative to the total weight of the aqueous ink.

The aqueous ink, in particular the aqueous gel ink, with fixed color of the disclosure and the aqueous suspension obtainable in step (ii) comprise in particular alkali metal salt, more specifically sodium salts. Indeed, this composition shall be obtained by the above-described process, which uses at least an alkali metal hydride and may also uses an alkali metal salt of citrate. When the above-described process uses an alkaline earth metal salt of citrate, the resulting aqueous ink composition and the aqueous suspension obtainable in step (ii) comprise alkaline earth metal salt in addition to an alkali metal salt.

In particular, the amount of alkali metal salt is of at least 0.002 weight %, in particular ranges from 0.002 to 0.016 weight %, based on the total weight of the aqueous ink and/or based on the total weight of the aqueous suspension. In particular, when present, the amount of alkaline earth metal is of at least 0.00009 weight %, more specifically ranges from 0.00009 to 0.007 weight %, based on the total weight of the aqueous ink and/or based on the total weight of the aqueous suspension.

In the aqueous gel ink with fixed color of the invention, the amount of water specifically ranges from 50 to 95% and more specifically from 60 to 90% and even more specifically from 70 to 85%, by weight relative to the total weight of the aqueous gel ink.

The aqueous gel ink with fixed color of the invention may also comprise classic gel ink ingredients such as co-solvents, antimicrobial agents, corrosion inhibitors, antifoam agents, rheology modifiers, as described below. These gel ink ingredients are added to the gel-based matrix of aqueous ink in step (i) of the process of the invention.

The aqueous gel ink of the invention may comprise a co-solvent. Among the co-solvents that can be used, mention may be made of polar solvents miscible in water such as:
- glycol ethers such as triethylene glycol, polyethylene glycol, diethylene glycol monoethyl ether, diethyleneglycol-mono butyl ether, dipropyleneglycol monobutyl ether, tripropylene glycol monomethyl ether, phenoxyethanol, phenoxypropanol,
- alcohols: linear or branched alcohol in $C_1$-$C_{15}$ such as isopropanol, butanol, isobutanol, pentanol, benzyl alcohol, glycerin, diglycerin, polyglycerin,
- esters such as ethyl acetate or propyl acetate,
- carbonate esters such as propylene carbonate or ethylene carbonate,
- ketones such as methylisobutylketone (MIBK), acetone or cyclohexanone, and
- mixtures thereof.

In a specific embodiment, the co-solvent comprises at least a glycol ether, and more specifically chosen in the group consisting of triethylene glycol, polyethylene glycol, diethylene glycol monoethyl ether, diethylene-glycol-mono butyl ether, dipropyleneglycol monobutyl ether, tripropylene glycol monomethyl ether, phenoxyethanol, phenoxypropanol, and mixtures thereof. In a further specific embodiment, the co-solvent is chosen in the group consisting of triethylene glycol, polyethylene glycol, and mixture thereof.

Specifically, the co-solvent is present in the aqueous gel ink of the invention in an amount ranging from 5 to 35%, more specifically from 7 to 25% and even more specifically from 12 to 20%, by weight relative to the total weight of the aqueous gel ink.

The aqueous gel ink of the invention may comprise an antimicrobial agent such as isothiazolinone (ACTICIDE® from Thor), specifically chosen in the group consisting of 1,2-benzisothiazolin-3-one, 2-methyl-4-isothiazolin-3-one, and mixture thereof.

Specifically, the antimicrobial agent is present in the aqueous gel ink of the invention in an amount ranging from 0.01 to 0.5%, and more specifically from 0.1 to 0.2%, by weight relative to the total weight of the aqueous gel ink.

The aqueous gel ink of the invention may comprise a corrosion inhibitor, specifically chosen in the group consisting of tolytriazole, benzotriazole, and mixture thereof.

Specifically, the corrosion inhibitor is present in the aqueous gel ink of the invention in an amount ranging from 0.05 to 1%, more specifically from 0.07 to 0.5% and even more specifically from 0.08 to 0.15%, by weight relative to the total weight of the aqueous gel ink.

The aqueous gel ink of the invention may comprise an antifoam agent, specifically a polysiloxane-based antifoam agent, and more specifically an aqueous emulsion of modified polysiloxane (such as MOUSSEX® from Synthron, TEGO® Foamex from Evonik).

Specifically, the antifoam agent is present in the aqueous gel ink of the invention in an amount ranging from 0.05 to 1%, more specifically from 0.1 to 0.5% and even more specifically from 0.2 to 0.4%, by weight relative to the total weight of the aqueous gel ink.

The aqueous gel ink of the invention may comprise a rheology modifier capable of generating a gelling effect, in particular capable of generating a thixotropic phenomenon wherein the viscosity depends on the time of shear rate, for example chosen in the group consisting of polysaccharides such as xanthan gum, gum arabic, and mixture thereof.

Specifically, the rheology modifier is present in an amount ranging from 0.08 to 2%, more specifically from 0.2 to 0.8% and even more specifically from 0.3 to 0.6%, by weight relative to the total weight of the aqueous gel ink.

The aqueous ink with fixed color of the invention may also comprise other additives such as:
- pH regulators like sodium hydroxide and triethanolamine,
- lubricants,
- coalescing agents,
- crosslinking agents,
- wetting agents,
- plasticizers,
- antioxidants, and
- UV stabilizers.

When present, these additives are added to the matrix of aqueous ink in step (i) of the process of the invention.

In one aspect, the invention relates to a process for preparing an aqueous ink with fixed color, comprising the following steps:
(i) preparing a matrix of aqueous ink;
(ii) preparing an aqueous suspension of silver nanoparticles with fixed color by mixing silver salts with:
   water,
   a mixture of at least an alkali metal or alkaline earth metal salt of citrate, preferably an alkali citrate salt and an alkali metal hydride, preferably $NaBH_4$,
   a further reducing agent, preferably ascorbic acid,
   and oxidizing agent, preferably hydrogen peroxide $H_2O_2$
(iii) adding under agitation the aqueous suspension of silver nanoparticles obtained in step (ii) to the matrix of aqueous ink obtained in step (i), to obtain an aqueous ink with fixed color with silver nanoparticles dispersed therein.

In one aspect, the present invention also concerns an aqueous ink with fixed color obtainable by the process of the invention, said aqueous ink comprising silver nanoparticles, and in particular, alkali metal salt (such as sodium salts), in particular which are as defined in the present disclosure. It may also comprise an alkaline earth metal salt.

The aqueous ink with fixed color of the invention may also comprise classic ink ingredients as described previously, such as solvents, antimicrobial agents, corrosion inhibitors, antifoam agents, rheology modifiers. These ingredients are added to the matrix of aqueous ink in step (i) of the process of the invention.

In one aspect, the invention relates to the use of the aqueous ink, more specifically of the aqueous gel ink, of fixed color as defined above for writing onto an absorbing support. In one embodiment, the absorbing support is a porous substrate, specifically paper, cardboard, or textiles.

The present invention also concerns a method of writing with an aqueous ink; more specifically an aqueous gel ink, of fixed color comprising the step of writing onto an absorbing support, wherein the absorbing support is a porous substrate, specifically paper, cardboard or textiles, with an aqueous ink with fixed color according to the invention.

After writing onto an absorbing support with the aqueous ink of fixed color of the invention, the distance between the silver nanoparticles within the aqueous ink, more specifically the aqueous gel ink, applied on absorbing support is lower than 4 µm, specifically varies from 50 nm to 3 µm, and more specifically varies from 200 nm to 2 µm Finally, the present invention concerns a writing instrument comprising:
- an axial barrel containing the aqueous ink according to the invention, more specifically the aqueous gel ink, and
- a pen body which delivers the aqueous ink stored in the axial barrel.

The writing instrument of the invention may be chosen in the group consisting of gel pens, felt pens, correction fluid, markers, and specifically gel pens.

The invention will be better understood in reference to the example which is given in a non-limited way.

Example 1: Preparation of an Aqueous Gel Ink with Fixed Color According to the Process of the Present Invention Preparing a Gel-Based Matrix of Aqueous Ink (Step (i))

In a first step (i), a gel-based matrix of aqueous ink was prepared by mixing 15 g of triethylene glycol (co-solvent), 4 g of polyethylene glycol (co-solvent), 0.19 g of Acticide® MBS (antimicrobial agent), and 0.1 g of Additie RC8221 (corrosion inhibitor). The mixture was homogenised with a homogenizer mixer at a speed of 15 m·s$^{-1}$ during 15 minutes and heated at a temperature of 35° C. Then, 0.4 g of xanthan gum (rheology modifier) was added to the mixture. The mixture was homogenized with a homogenizing mixer at a speed of 15 m·s$^{-1}$ during 15 minutes at a temperature of 35° C. 80.01 g of deionized water was slowly added to the mixture. The mixture was left to stand for 2h30. Then, 0.3 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.).

Preparing an Aqueous Suspension of Silver Nanoparticles with Fixed Color (Step (ii))

In a second step (ii), an aqueous suspension of silver nanoparticles with a fixed color is prepared by mixing 39.3 mL of distilled water, 2 mL of trisodium citrate (75 mM) (S1804-500G Sigma Aldrich), 186 µL of a solution of silver nitrate (10 mM) (9370.1 Cark Roth) and 256 µL hydrogen peroxide 0.6% (412071 Carlo Erba) with a homogenizer mixer at a speed of 400 rpm during 5 minutes, Then 192 µL of sodium borohydride (100 mM) (71321-25G Fluka Analytical) was rapidly added to initiate reduction, and the solution immediately changed from transparent to a pale yellow color (nucleation step).

The solution was stored overnight at room temperature.

Then 200 µL of L-ascorbic acid (5 mM) (A92902-100G Sigma Aldrich) was added to this mixture, followed by addition of silver nitrate (10 mM) dropwise until the desired solution color was reached.

It should be noted that the color of the aqueous suspension of silver nanoparticles depends on the amount of silver nitrate added at this stage of the process (growing step).

The resulting composition exhibits a plasmonic effect, which means that its color is due to the plasmon effect i.e. due to the light absorption by the nanoparticles dispersion.

The addition of 2 drops (100 µL by drop) of silver nitrate $AgNO_3$ at this step lets to obtain a yellow suspension (test 1).

The addition of 4 drops (100 µL by drop) of silver nitrate $AgNO_3$ at this step lets to obtain an orange suspension (test 2).

The additions of 7 drops (100 µL by drop) of silver nitrate $AgNO_3$ at this step lets to obtain a red suspension (test 3).

Preparing the Aqueous Gel Ink with Fixed Color (Step (iii))

In a third step (iii), 1 mL of the aqueous suspension of silver nanoparticles obtained in step (ii) is added to 1 mL of the gel-based matrix of aqueous ink obtained in step (i) to obtain an aqueous gel ink with fixed color with silver nanoparticles dispersed therein.

Test 1: After adding on the gel-based matrix of aqueous ink, the color initially yellow appears immediately pink.

Test 2: After adding on the gel-based matrix of aqueous ink, the color initially orange appears immediately blue.

Test 3: After adding on the gel-based matrix of aqueous ink, the color initially red appears immediately black.

Test 1: When the obtained aqueous gel ink with fixed color was written on cellulosic paper, the color appeared immediately pink and did not change after all.

Test 2: When the obtained aqueous gel ink with fixed color was written on cellulosic paper, the color appeared immediately blue and did not change after all.

Test 3: When the obtained aqueous gel ink with fixed color was written on cellulosic paper, the color appeared immediately black and did not change after all.

Furthermore, a visual assessment of the color of this aqueous gel inks was realized over time (tests 1, 2, and 3).

As can be seen from Table 1, the color of the aqueous gel ink did not change over time.

TABLE 1

Example 1 - Visual assessment of the color of aqueous gel ink (Test 1, 2, 3) over time

| Time | 0 min | 2 min | 1 hour | 1 day | 1 week |
|---|---|---|---|---|---|
| Test 1 | | | | | |
| Color of the aqueous gel ink before application on cellulosic paper | pink | pink | pink | pink | pink |
| Color of the aqueous gel ink after application | pink | pink | pink | pink | pink |

TABLE 1-continued

Example 1 - Visual assessment of the color
of aqueous gel ink (Test 1, 2, 3) over time

| Time | 0 min | 2 min | 1 hour | 1 day | 1 week |
|---|---|---|---|---|---|
| on cellulosic paper Test 2 | | | | | |
| Color of the aqueous gel ink before application on cellulosic paper | blue | blue | blue | blue | blue |
| Color of the aqueous gel ink after application on cellulosic paper Test 3 | blue | blue | blue | blue | blue |
| Color of the aqueous gel ink before application on cellulosic paper | black | black | black | black | black |
| Color of the aqueous gel ink after application on cellulosic paper | black | black | black | black | black |

The invention claimed is:

1. A process for preparing an aqueous gel ink with fixed color comprising:
   (i) preparing a gel-based matrix of aqueous ink;
   (ii) preparing an aqueous suspension of silver nanoparticles with fixed color by mixing silver salts with:
      water,
      a mixture of at least an alkali metal or alkaline earth metal salt of citrate, and an alkali metal hydride,
      a further reducing agent, wherein said further reducing agent is ascorbic acid and/or an amount of the further reducing agent that is added ranges from 0.002 weight % to 0.01 weight %, based on a total weight of the aqueous suspension of silver nanoparticles, and
      an oxidizing agent; and
   (iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

2. The process according to claim 1, wherein step ii) comprises:
   a first step ii. a) of mixing said alkali metal or alkaline earth metal salt of citrate salts with said alkali metal hydride, and with said oxidizing agent,
   followed by a second step ii. b) comprising addition of said further reducing agent, and
   followed by a third step ii. c) comprising a further addition of silver salt.

3. The process according to claim 1, wherein a total amount of said citrate salts added in step (ii) ranges from 0.02 to 0.1 weight % based on the total weight of the aqueous suspension.

4. The process according to claim 1, wherein a total amount of said silver salts added in step (ii) ranges from 0.0001 to 5 weight % based on the total weight of the aqueous suspension.

5. The process according to claim 1, wherein an amount of alkali metal hydride added in step (ii) ranges from 0.0005 to 0.002 weight % based on the total weight of the aqueous suspension.

6. The process according to claim 1, wherein the amount of oxidizing agent added in step (ii) ranges from 0.001 to 0.005 weight % based on the total weight of the aqueous suspension.

7. A process for preparing an aqueous gel ink with fixed color comprising:
   (i) preparing a gel-based matrix of aqueous ink;
   (ii) preparing an aqueous suspension of silver nanoparticles with fixed color by mixing silver salts with:
      water,
      a mixture of at least an alkali citrate salt and sodium borohydride $NaBH_4$,
      ascorbic acid, wherein an amount of the ascorbic acid that is added ranges from 0.002 weight % to 0.01 weight %, based on a total weight of the aqueous suspension of silver nanoparticles, and
      hydrogen peroxide $H_2O_2$; and
   (iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

8. The process according to claim 1, wherein the alkali metal or the alkaline earth metal salt of citrate comprises an alkali citrate salt.

9. The process according to claim 1, wherein the alkali metal or the alkaline earth metal salt of citrate comprises sodium citrate.

10. The process according to claim 1, wherein the alkali metal hydride comprises sodium borohydride $NaBH_4$.

11. The process according to claim 1, wherein the oxidizing agent comprises hydrogen peroxide $H_2O_2$.

12. A process for preparing an aqueous gel ink with fixed color comprising the following steps:
   (i) preparing a gel-based matrix of aqueous ink;
   (ii) preparing an aqueous suspension of silver nanoparticles with fixed color by mixing silver salts with:
      water,
      a mixture of at least an alkali metal or alkaline earth metal salt of citrate, and an alkali metal hydride, wherein an amount of alkali metal hydride that is added ranges from 0.0005 to 0.002 weight %, based on a total weight of the aqueous suspension of silver nanoparticles,
      a further reducing agent, and
      an oxidizing agent; and
   (iii) adding under agitation the aqueous suspension of silver nanoparticles obtained in step (ii) to the gel-based matrix of aqueous ink obtained in step (i), to obtain an aqueous gel ink with fixed color with silver nanoparticles dispersed therein.

* * * * *